(12) United States Patent
Briggs et al.

(10) Patent No.: US 12,577,135 B2
(45) Date of Patent: Mar. 17, 2026

(54) CHLORINATOR SYNCHRONOUS RECTIFICATION

(71) Applicant: FLUIDRA GROUP AUSTRALIA PTY LTD., Smithfield (AU)

(72) Inventors: Rod Briggs, Beaumaris (AU); Frank Harris, Malvern East (AU); Steve Fallon, Sassafras (AU); Dime Risteski, Aintree (AU); Ethan Achterberg, Carrum Downs (AU)

(73) Assignee: FLUIDRA GROUP AUSTRALIA PTY LTD., Smithfield NSW (AU)

( * ) Notice: Subject to any disclaimer, the term of this patent is extended or adjusted under 35 U.S.C. 154(b) by 262 days.

(21) Appl. No.: 18/120,240

(22) Filed: Mar. 10, 2023

(65) Prior Publication Data

US 2023/0286837 A1 Sep. 14, 2023

Related U.S. Application Data

(60) Provisional application No. 63/319,023, filed on Mar. 11, 2022.

(51) Int. Cl.
*C02F 1/467* (2023.01)
*C02F 1/461* (2023.01)
(Continued)

(52) U.S. Cl.
CPC ........ *C02F 1/4674* (2013.01); *C02F 1/46104* (2013.01); *F21V 23/02* (2013.01);
(Continued)

(58) Field of Classification Search
CPC ............... C02F 1/46104; C02F 1/4674; C02F 2103/42; C02F 2201/46135;
(Continued)

(56) References Cited

U.S. PATENT DOCUMENTS 5,034,110 A * 7/1991 Glore .................. C02F 1/46109
204/278
2011/0253637 A1 10/2011 McCague
(Continued)

FOREIGN PATENT DOCUMENTS

CN 113853358 A 12/2021
FR 2908138 A1 5/2008
(Continued)

OTHER PUBLICATIONS

European Application No. 22779277.7, Extended European Search Report mailed on May 7, 2024, 11 pages.
(Continued)

*Primary Examiner* — Dirk R Bass
(74) *Attorney, Agent, or Firm* — Kilpatrick Townsend & Stockton LLP

(57) ABSTRACT

A chlorinator system includes a swimming pool chlorinator configured to perform chlorination operations of a salt water pool system. The swimming pool chlorinator includes an electrolysis cell configured to receive a flow of pool water and to electrolyze sodium chloride in the pool water to generate chlorine and control electronics configured to control operations of the swimming pool chlorinator. Additionally, the chlorinator system includes a power source coupler configured to receive alternating current power from an alternating current power source. Further, the chlorinator system includes a synchronous rectifier configured to convert the alternating current power to generate a direct current power source to provide power to the swimming pool chlorinator.

19 Claims, 8 Drawing Sheets

(51) Int. Cl.
| | |
|---|---|
| *F21V 23/02* | (2006.01) |
| *H02M 7/217* | (2006.01) |
| *C02F 103/42* | (2006.01) |
| *F21W 131/401* | (2006.01) |

(52) U.S. Cl.
CPC ......... *H02M 7/217* (2013.01); *C02F 2103/42* (2013.01); *C02F 2201/46135* (2013.01); *C02F 2201/4614* (2013.01); *C02F 2201/4617* (2013.01); *C02F 2209/008* (2013.01); *F21W 2131/401* (2013.01)

(58) Field of Classification Search
CPC .... C02F 2201/4614; C02F 2201/46165; C02F 2201/4617; C02F 2209/008; F21V 23/02; F21W 2131/401; H02M 7/217; H02M 7/219
See application file for complete search history.

(56) References Cited

U.S. PATENT DOCUMENTS

| | | | |
|---|---|---|---|
| 2018/0240322 A1 | 8/2018 | Potucek et al. |
| 2019/0314243 A1 | 10/2019 | MacCallum et al. |
| 2020/0319621 A1 | 10/2020 | Roy et al. |

FOREIGN PATENT DOCUMENTS

| | | |
|---|---|---|
| WO | 2006058369 A1 | 6/2006 |
| WO | 2022208361 A1 | 10/2022 |

OTHER PUBLICATIONS

U.S. Appl. No. 17/707,463, Non-Final Office Action mailed on Jan. 15, 2025, 15 pages.
International Application No. PCT/IB2022/052905, International Preliminary Report on Patentability mailed on Oct. 12, 2023, 6 pages.
International Application No. PCT/IB2023/052335, International Search Report and the Written Opinion mailed on Jun. 6, 2023, 13 pages.
International Application No. PCT/IB2023/052335, International Preliminary Report on Patentability mailed on Sep. 26, 2024, 9 pages.
U.S. Appl. No. 17/707,463, Final Office Action mailed on Jul. 29, 2025, 14 pages.
European Patent Application 23766249.9, Extended European Search Report mailed on Jul. 3, 2025, 10 pages.
International Application No. PCT/IB2022/052905, International Search Report and Written Opinion mailed on May 16, 2022, 10 pages.

* cited by examiner

CHLORINATOR SYNCHRONOUS RECTIFICATION

CROSS-REFERENCE TO RELATED APPLICATION

This application claims the benefit of U.S. Provisional Patent Application No. 63/319,023, filed on Mar. 11, 2022, and entitled "CHLORINATOR SYNCHRONOUS RECTI-FICATION," the contents of which is hereby incorporated by reference in its entirety for all purposes.

TECHNICAL FIELD

This disclosure relates to salt water chlorination systems, and more specifically, although not necessarily exclusively, to concepts and methods for synchronous rectification of a power source at a salt water chlorination system in swimming pools or spas.

BACKGROUND

Salt water chlorination is a process that uses dissolved salt as a source of chlorine for a chlorination system. In a salt chlorinated pool there are high levels of sodium chloride, typically in a recommended concentration of about 3000 to 5000 ppm (of Total Dissolved Solids (TDS) of about 4500 to 7500 ppm). A salt water chlorine generator (also known as a chlorinator) includes an electrolysis cell to electrolyze sodium chloride in the water to generate chlorine at the anode of the electrolysis cell. The chlorine reacts with a hydroxide (that is, sodium hydroxide NaOH) in the water (along with hydrogen gas produced at the cathode) to form hypochlorite anions from hypochlorous acid (HClO) and sodium hypochlorite (NaClO), which are sanitizing agents commonly used in swimming pools. Electrolytic halogenation of water in swimming pools, spas and the like is an effective method to reduce or minimize the effects of water borne micro-organisms such as bacteria, viruses, algae, parasites and the like.

Equipment at a salt chlorinated pool may be powered by alternating-current mains power at the pool. To provide direct-current power to the chlorinator, the mains power may be rectified. Rectification of the mains power may involve significant heat dissipation at the chlorinator, which may result in costly and cumbersome heat management systems to protect electronics within the chlorinator. The heat management systems may include large heat sinks or fan systems that lead to a more complicated design with more cumbersome components.

SUMMARY

Embodiments described in this disclosure are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

According to certain embodiments, a chlorinator system includes a swimming pool chlorinator that performs chlorination operations of a salt water pool system. The swimming pool chlorinator includes an electrolysis cell that receives a flow of pool water and electrolyzes sodium chloride in the pool water to generate chlorine. Additionally, the swimming pool chlorinator includes control electronics that control operations of the swimming pool chlorinator. Further, the chlorinator system includes a power source coupler that receives alternating current power from an alternating current power source. Furthermore, the chlorinator system includes a synchronous rectifier that converts the alternating current power to generate a direct current power source to provide power to the swimming pool chlorinator.

According to an additional embodiment, a method includes establishing an electrical coupling between an alternating current mains power source and a chlorinator system of a salt water pool and spa system. The method also includes synchronously rectifying the alternating current mains power source using a synchronous rectifier of the chlorinator system to generate a direct current power source. Additionally, the method includes stepping down a voltage of the alternating current mains power source or the direct current power source. Further, the method includes providing the direct current power source at a stepped down voltage to electronics of the chlorinator system. The electronics of the chlorinator system include an electrolysis cell that receives a flow of pool water and to electrolyze sodium chloride in the pool water to generate chlorine and control electronics that control operations of the swimming pool chlorinator.

According to an additional embodiment, a pool or spa system includes a chlorinator system. The chlorinator system includes a swimming pool chlorinator that performs chlorination operations of a salt water pool system. Additionally, the chlorinator system includes at least one transceiver that provides short-range communication between the swimming pool chlorinator and at least one additional component of the salt water pool and spa system. Further, the chlorinator system includes a power source coupler that receives alternating current power from an alternating current power source. Furthermore, the chlorinator system includes a synchronous rectifier configured to convert the alternating current power to generate a direct current power source to provide power to the swimming pool chlorinator and the at least one transceiver.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DESCRIPTION

The subject matter of the present embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. References to "pools" and "swimming pools" herein may also refer to spas or other water containing vessels used for recreation or therapy.

Described herein are systems and methods for synchronous rectification in pool and spa system equipment, such as a chlorinator. In certain aspects, the systems and methods described herein may provide greater control of the rectified output than an output provided by a diode-based rectifier. Further, synchronous rectifiers may provide temperature management for the chlorinator without having to add additional components to the chlorinator, such as additional heat sinks or fans, to mitigate heat generated from the rectification process. By limiting added components to the chlorinator system, the physical footprint of the chlorinator system may be reduced while also providing enhanced functionality.

Figure 1:
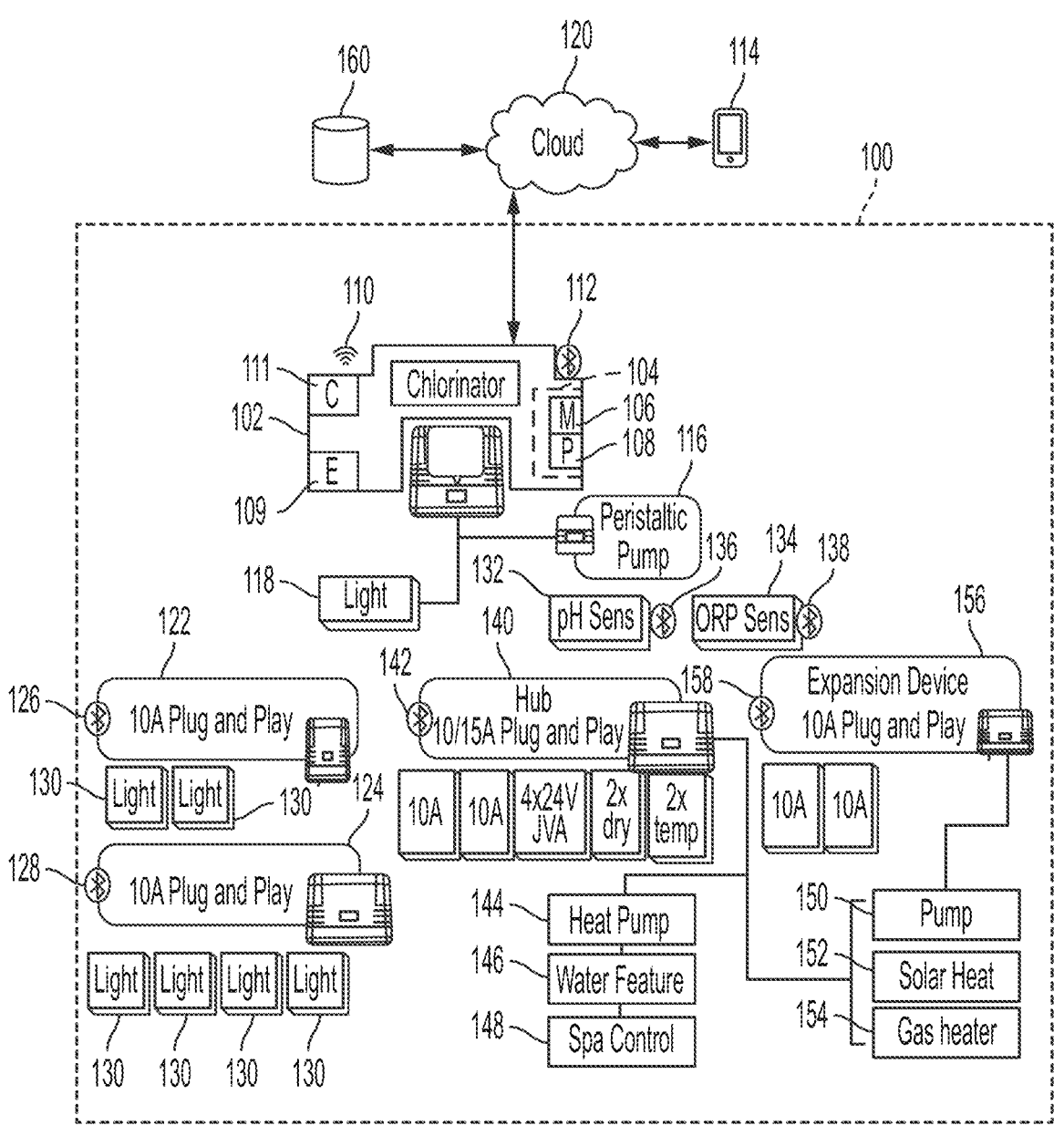
FIG. 1 illustrates a communication scheme of pool and spa equipment of a pool system according to embodiments of the disclosure.

FIG. 1 illustrates a communication scheme of pool and spa equipment of a pool system 100 according to embodiments of the disclosure. The pool system 100 may include equipment associated with maintaining a pool or spa. For example, the pool system 100 may include a series of connectable devices that perform pool related functions. As illustrated, a chlorinator 102, which operates to chlorinate a salt water pool or spa, may, in some examples, function as a communication hub for the pool system 100. For example, the chlorinator 102 includes a computing system 104 that includes a memory device 106 and a processor 108. The computing system 104 may control electronics 109 that control chlorination operations of the chlorinator 102 and operation of an electrolysis cell 111 through which pool water flows. In an example, the electrolysis cell 111 electrolyzes sodium chloride in the pool water to generate chlorine at an anode (not shown) of the electrolysis cell 111. The chlorine reacts with a hydroxide (that is, sodium hydroxide NaOH) in the water (along with hydrogen gas produced at the cathode) to form hypochlorite anions from hypochlorous acid (HClO) and sodium hypochlorite (NaClO), which are sanitizing agents commonly used in swimming pools. Electrolytic halogenation of water in swimming pools, spas and the like is an effective method to reduce or minimize the effects of water borne micro-organisms such as bacteria, viruses, algae, parasites and the like.

Additionally, the computing system 104 may control operation of antennas 110 and 112, which are used to communicate with other pool and spa components and with a remote computing device 114. For example, the antenna 110 may be used to connect to a wireless router or to a cellular data network for access to the cloud 120, and the antenna 112 may be used in short-range communication, such as in a Bluetooth® communication scheme. As used herein, the term "short-range communication" may refer to a communication scheme that is only available for a limited distance from the chlorinator 102. In some examples, the limited distance may be 10 meters, 20 meters, 30 meters, or a larger distance from the chlorinator 102 depending on the specific nature of the antenna 112 used for the short-range communication.

In addition to providing communication links, the chlorinator 102 may also provide power to a peristaltic pump 116 and a pool lighting system 118. Other pool and spa components may also receive power directly from the chlorinator 102. In some examples, the chlorinator 102 may receive alternating current (AC) power from a mains power source and rectify the AC power to provide DC power to the chlorinator 102 and the other pool and spa components.

By providing access to the cloud 120, the chlorinator 102, which may operate as a communication hub for components of the pool system 100, may provide a mechanism for an end user to interact with or otherwise control the pool system 100 from the remote computing device 114 that operates a pool system control application. The remote computing device 114 may be a mobile phone, a computer, a laptop, a tablet, or any other electronic device remote from the pool system 100. As used herein, the term "remote" may refer to a component that is not physically coupled to a component of the pool system 100. The wireless communication provided by the chlorinator 102 may be a mechanism to reduce or avoid an amount of wired communication between the components of the pool system 100. For example, the components of the pool system 100 may all be powered using mains power received from electrical outlets, and the communication between devices may all be wireless through the chlorinator 102. In some examples, even components of the pool system 100 that receive power from the chlorinator 102, such as the peristaltic pump 116 and the light 118, may communicate with the chlorinator 102 wirelessly.

Light controllers 122 and 124 may be powered by their own power sources, such as mains power. The light controllers 122 and 124 may include short-range communication antennas 126 and 128 that are able to transmit and receive communication signals from the antenna 112 of the chlorinator 102. The communication signals received from the chlorinator 102 may be instructions for the light controllers 122 and 124 to control lights 130 of the pool system 100. In some examples, the light controllers 122 and 124 may also be standalone light controllers that are able to receive control instructions directly from the remote computing device 114. In an example where the light controllers 122 and 124 are standalone light controllers, the light controllers 122 and 124 may cross-communicate with the chlorinator 102 such that the standalone light controllers 122 and 124 are communicatively slaved to the chlorinator 102. In other words, the chlorinator 102 may relay control signals from a remote computing device 114 to the light controller 122 and 124.

A pH sensor 132, an oxidation reduction potential (ORP) sensor 134, or any additional sensors for the pool system 100 may also communicate with the antenna 112 of the chlorinator 102 using short-range antennas 136 and 138. The sensors 132 and 134 may feed information to the chlorinator 102 such that the chlorinator 102 is able to activate and deactivate the chlorinator cells to match a chlorine demand for the pool. The chlorinator 102 may also use the information provided by the sensors 132 and 134 to Control operation of the peristaltic pump to add acid to the pool to maintain a desired pH balance.

A hub device 140 may include a short-range antenna 142 that is able to communicate with the antenna 112 of the chlorinator 102. The hub device 140 may include a number of 10 A sockets and a series of inputs that enable other components of the pool system to be controlled by the chlorinator 102. For example, a heat pump 144, a water feature 146, a spa controller 148, a pump 150, a solar heater 152, a gas heater 154, or any combination thereof may be connected to the hub device 140 for wireless control by the chlorinator 102. Other components of the pool system 100, such as valve actuators, may also be connected to the hub device 140 for control by the chlorinator 102. In an example, the hub device 140 may receive power from a mains power connection, or any other power source, and be wirelessly coupled to the chlorinator 102 through a short-range communication scheme, such as Bluetooth® communication.

An expansion device 156 may also include a short-range antenna 158 that is able to communicate with the antenna 112 of the chlorinator 102. The expansion device 156 may include a number of 10 A sockets and a series of temperature sensor inputs that enable other components of the pool system to be controlled by the chlorinator 102. For example, the pump 150, the solar heater 152, the gas heater 154, or any combination thereof may be connected to the expansion device 156 for wireless control by the chlorinator 102. Other components of the pool system 100, such as valve actuators, may also be connected to the expansion device 156 for control by the chlorinator 102. In an example, the expansion device 156 may receive power from a mains power connection, or any other power source, and be wirelessly coupled to the chlorinator 102 through a short-range communication scheme, such as Bluetooth® communication.

While the light controllers 122 and 124 can, in some examples, operate as both slave devices to the chlorinator 102 and as standalone devices, the sensors 132 and 134, the hub device 140, and the expansion device 156 may, in some examples, all operate exclusively as slave devices to the chlorinator 102. In some examples, the short-range communication scheme between the chlorinator 102 and the other components of the pool system 100 may form a Bluetooth® mesh network.

In some examples, the chlorinator 102 may communicate with the remote computing device 114 using either a short-range communication scheme through the antenna 112 or through a wireless internet connection through the antenna 110 and the cloud 120. In some examples, the remote computing device 114 may make a determination about whether the remote computing device 114 is within range of the short-range antenna 112 of the chlorinator 102. If the remote computing device 114 is within range of the short-range antenna 112, then the remote computing device 114 may automatically communicate with the chlorinator 102 using the short-range communication scheme. If the remote computing device 114 is not within range of the short-range antenna 112, then the remote computing device 114 may communicate with the chlorinator 102 using the cloud 120 and the antenna 110.

Further, the chlorinator 102 may communicate with a remote database 160 that maintains firmware updates for the components of the pool system 100. For example, the chlorinator 102 may download a firmware package from the remote database 160 through the cloud 120 and verify the authenticity of the firmware package. In some examples, the chlorinator 102 may download the firmware package from the remote computing device 114, or any other remote computing device, either locally through the short-range communication scheme or remotely through the wireless Internet connection. The firmware package may include one or more instances of firmware intended for one or more of the connected components of the pool system 100. The chlorinator 102 may open the firmware package and transmit individual firmware updates to respective connected components (e.g., the hub device 140, the expansion device 156, the lighting controller 122 and 124, the sensors 132 and 134, etc.) of the pool system 100.

In some examples, the pool system 100 may initially include a limited number of external components. The wireless communication scheme provided by the chlorinator 102 may enable modularity to the external components of the pool system 100. For example, the external components of the pool system 100 may be added to the short-range communication network of the chlorinator 102 over time in a seamless manner. Further, a control menu of the chlorinator 102 and the remote computing device 114 may be dynamically updated as new external components when new available operations are added to the short-range communication network of the chlorinator 102.

Because the chlorinator 102 operates as a communication hub for the pool system 100, greater control of the rectified output may be desirable due to sensitive electronics of the chlorinator 102 that are used to provide the communication functionalities. Accordingly, the power source for the chlorinator 102 may be rectified using a synchronous rectifier, as discussed below with respect to FIG. 2. The synchronous rectifiers may provide temperature management for the chlorinator 102 without having to add additional components to the chlorinator 102, such as additional heat sinks or fans, to mitigate heat generated from the rectification process. By limiting added components to the chlorinator 102, the physical footprint of the chlorinator 102 may be reduced while also enabling the enhanced functionality.

Figure 2:
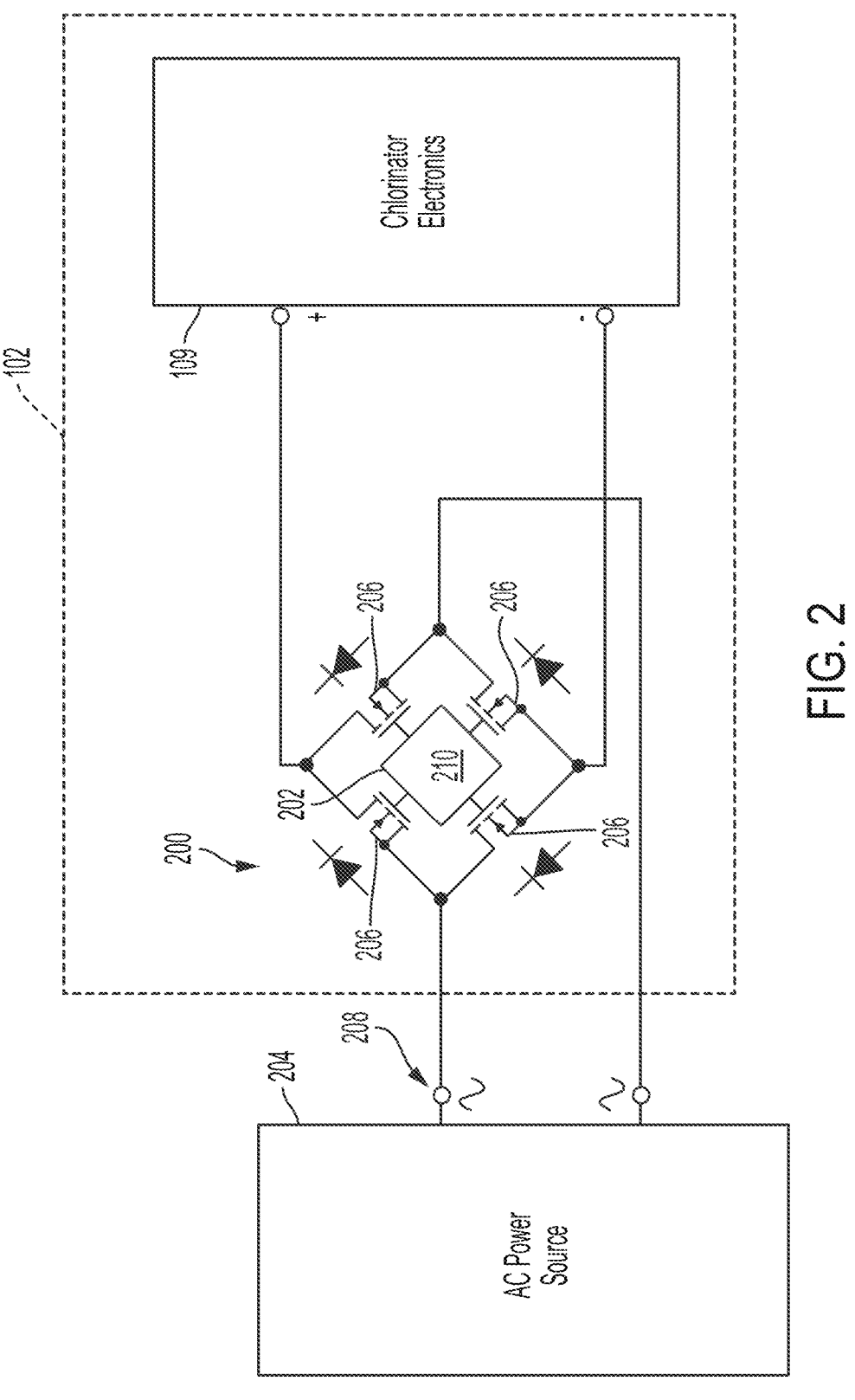
FIG. 2 illustrates a synchronous rectifier of a chlorinator of the pool system of FIG. 1 according to embodiments of the disclosure.

FIG. 2 illustrates an example of a synchronous rectifier 200 of the chlorinator 102 according to embodiments of the disclosure. The synchronous rectifier 200 may include a synchronous rectifier chipset 202, such as an LT4320 chip or a FAN6248 chip, which is capable of controlling a synchronous rectification process. Other chips capable of controlling a synchronous rectification process may also be used in addition to or in place of the synchronous rectifier chipset 202. The synchronous rectification process may enable rectification of an AC power source 204 to provide DC power to the chlorinator electronics 109. As shown, the synchronous rectifier 200 may include a set of metal-oxide-semiconductor field-effect transistors (MOSFETs) 206 that replace biasing devices, such as diodes, in other rectifier arrangements. Additionally, a synchronous rectifier controller 210 may control the operation of the MOSFETs 206 to rectify the AC power input and generate the DC power output. In some examples, the synchronous rectifier 200 may include a set of four MOSFETs 206 that perform synchronous rectification, while in other examples the synchronous rectifier 200 may include a set of two MOSFETs 206 that perform synchronous rectification.

Synchronous rectification may be used in a "switched-mode" power supply or in a linear power supply. Due to a higher operating frequency of the switched-mode power supply (e.g., 50 kHz-1 MHz) compared to a linear power supply (e.g., with a frequency similar to mains power of 50 or 60 Hz), the synchronous rectification at the switched-mode power supply may be used in conjunction with a smaller transformer than a transformer used in the linear power supply.

In an example, a power supply of the chlorinator 102 provides DC power to a chlorine generating cell of the chlorinator 102. The chlorinator 102 may couple to the AC power source 204 at a power source coupler 208, such as an electrical plug of a power cable. The DC power may be converted from the AC power source 204 using the synchronous rectifier 200. Because heat generated from the synchronous rectifier 200 is minimal, the physical size of a chlorinator power supply may be reduced due to avoiding the need for components to address excess heat generated from internal resistances of diode or silicon-controlled rectifiers (SCRs), for example. In other words, large heat sinks or added heat dissipating fans may be avoided using the synchronous rectifier 200. Further, the synchronous rectifier 200 may provide more control over the DC power provided to the chlorinator 102 than through other rectification systems and techniques.

Figure 3:
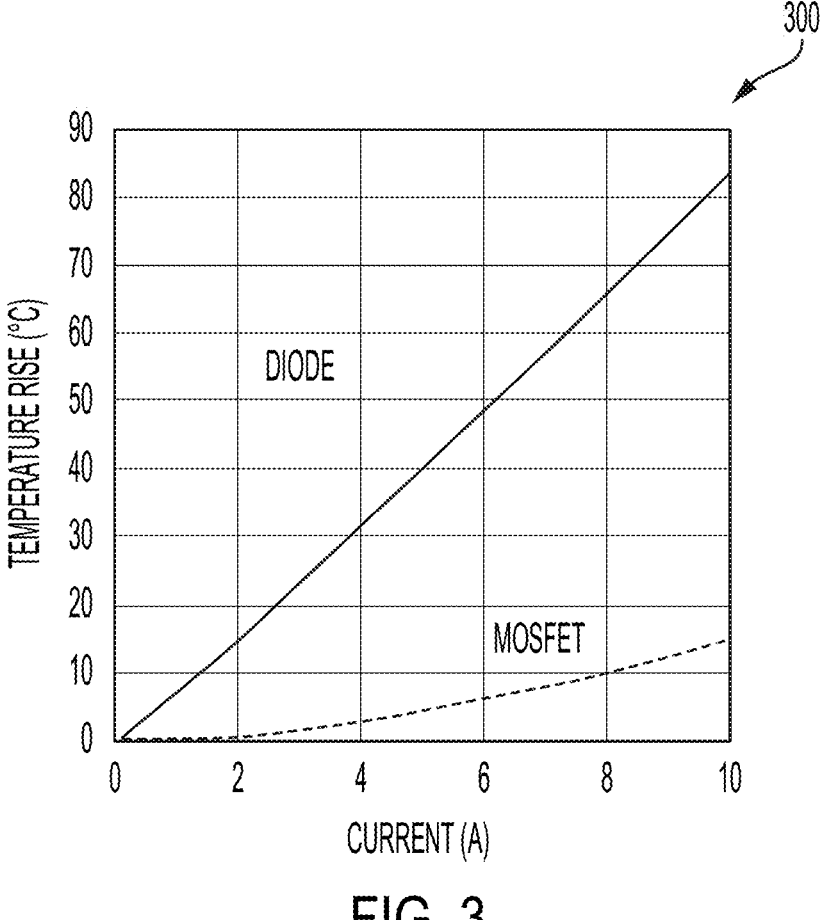
FIG. 3 illustrates a temperature chart comparing a metal-oxide-semiconductor field-effect transistor (MOSFET) of the synchronous rectifier of FIG. 2 with a diode according to embodiments of the disclosure.

Turning to FIG. 3, a temperature chart 300 comparing a MOSFET 206 of the synchronous rectifier 200 with a diode is illustrated according to embodiments of the disclosure. The temperature chart 300 provides an example of the temperature rises of a typical diode (e.g., in a non-synchronous rectifier) and a typical MOSFET (e.g., in a synchronous rectifier). As depicted, the temperature rise of the MOSFET during operation of the synchronous rectifier 200 is small relative to the temperature rise of a typical diode during operation of a non-synchronous rectifier. Accordingly, the implementation of the synchronous rectifier 200 in the chlorinator 102 of the pool system 100 to provide DC power to the chlorinator 102 may enable a reduction in a number of overall components of the chlorinator 102 and a reduction in the physical size of the chlorinator 102. In such an example, the chlorinator 102 may avoid cumbersome heat-sink fins or fan systems. While synchronous rectification is described above using MOSFETs, other high current transistors or FETS may also be used.

Figure 4:
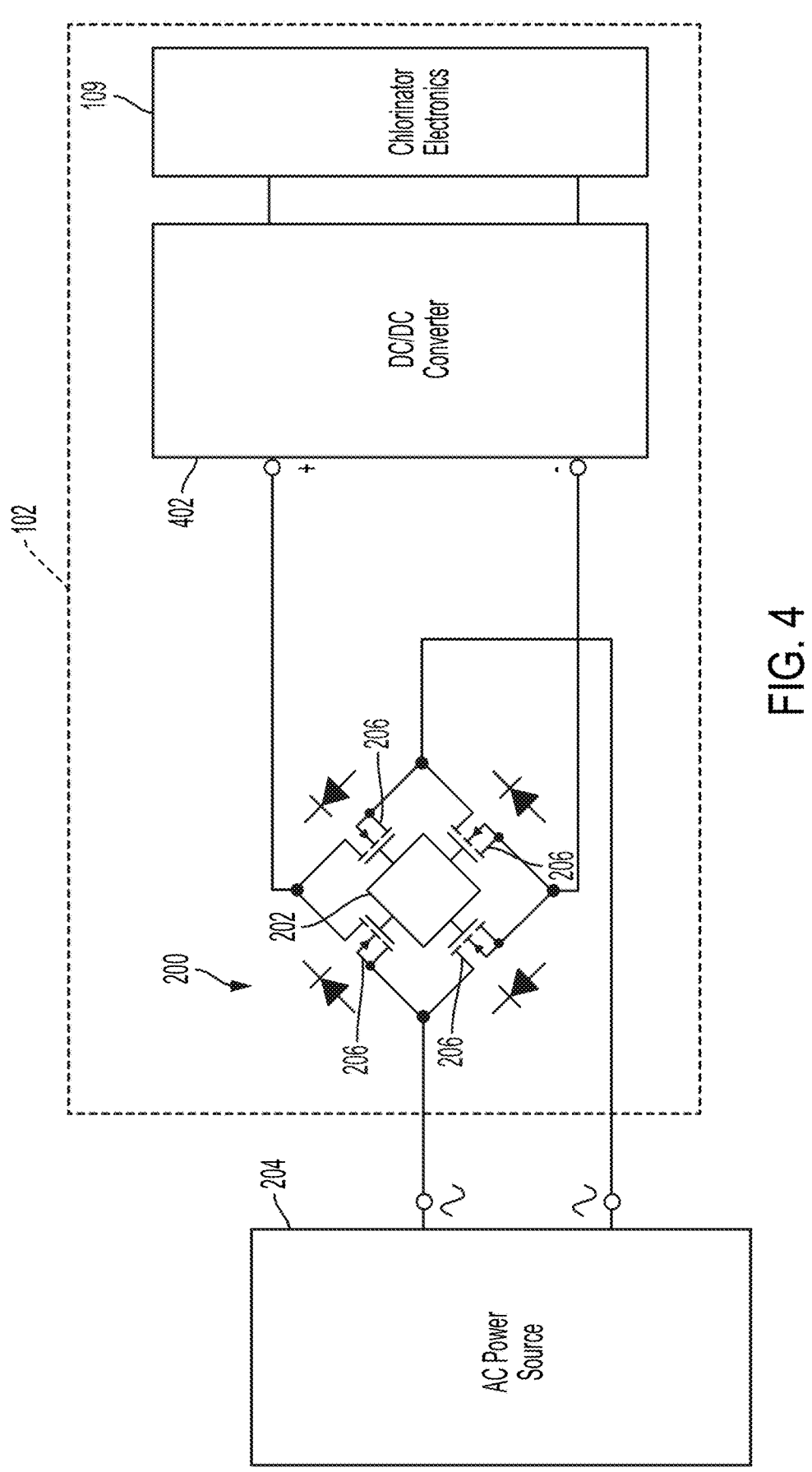
FIG. 4 illustrates an additional example of a synchronous rectifier of a chlorinator of the pool system of FIG. 1 according to embodiments of the disclosure.

FIG. 4 illustrates an additional example of the synchronous rectifier 200 of the chlorinator 102 of the pool system 100 according to embodiments of the disclosure. As with the example described with respect to FIG. 2, the synchronous rectifier 200 may include the synchronous rectifier chipset 202, such as an LT4320 chip or a FAN6248 chip, that is capable of controlling a synchronous rectification process. As used herein, the term chipset may refer to a collection of integrated circuits that form a set used to make an electronic device, such as the synchronous rectifier 200. Other chipsets capable of controlling a synchronous rectification process may also be used in addition to or in place of the synchronous rectifier chipset 202. The synchronous rectification process may enable rectification of an AC power source 204 to provide DC power to the chlorinator electronics 109. As shown, the synchronous rectifier 200 may include the set of MOSFETs 206 that replace biasing devices, such as diodes, in other rectifier arrangements.

In an example, the DC power provided to the chlorinator electronics 109 may be converted from the AC power source 204 using the synchronous rectifier 200. In some examples, the synchronous rectifier 200 may be positioned on a primary, side of the power supplied by the AC power source 204. For example, an isolating transformer may not be positioned between the AC power supply 204 and the synchronous rectifier 200. In such an example, a DC-to-DC converter 402, such as a buck converter, may be implemented between the synchronous rectifier 200 and the chlorinator electronics 109 to control the voltage of the rectified output of the synchronous rectifier 200. Further, while the synchronous rectifier 200 and the DC-to-DC converter 402 are depicted as being within the chlorinator 102, the synchronous rectifier 200 and the DC-to-DC converter 402 may be disposed either within a housing of the chlorinator 102 or at a location external to the housing of the chlorinator 102.

Figure 5:
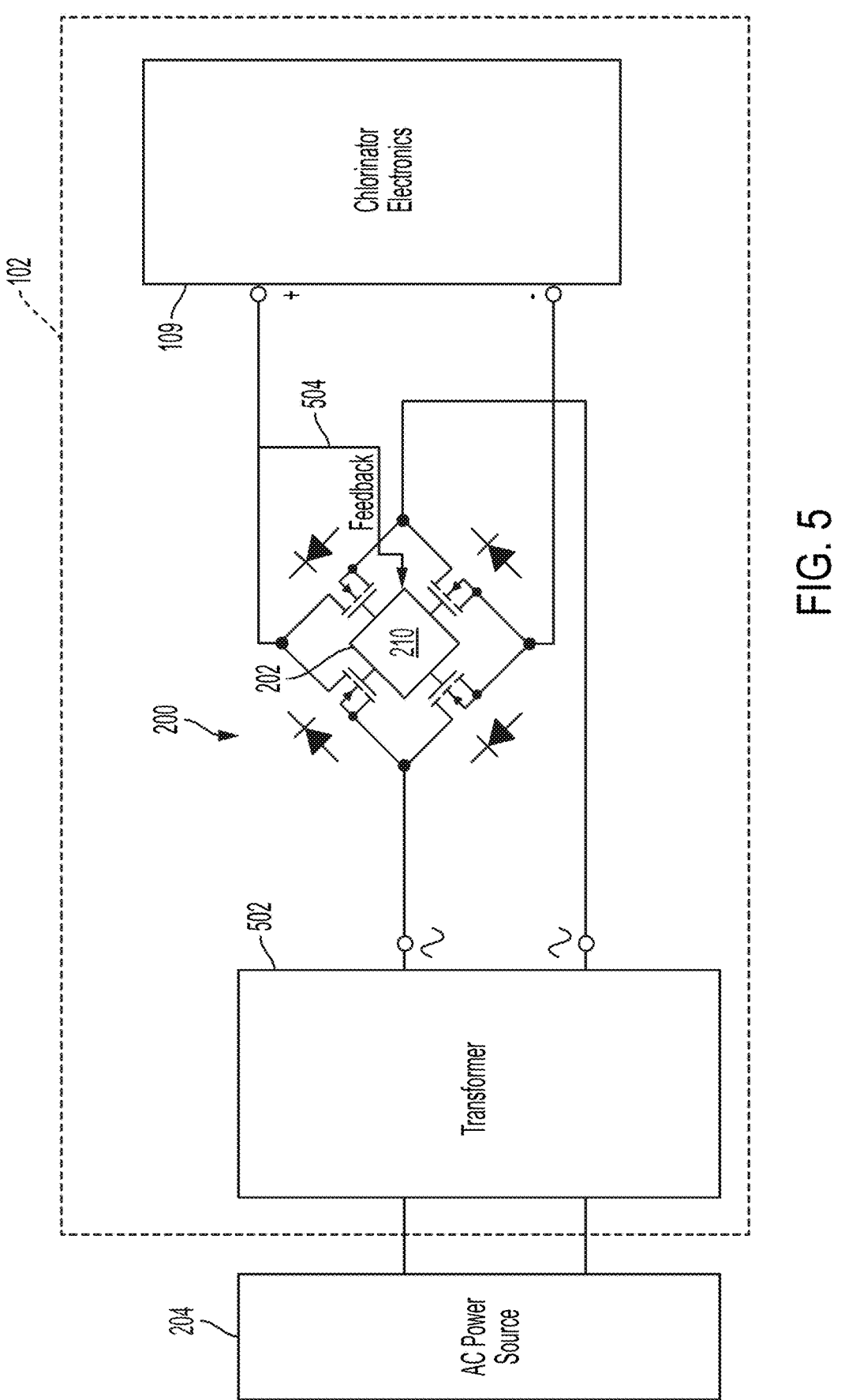
FIG. 5 illustrates an additional example of a synchronous rectifier of a chlorinator of the pool system of FIG. 1 according to embodiments of the disclosure.

FIG. 5 illustrates an additional example of the synchronous rectifier 200 of the chlorinator 102 of the pool system 100 according to embodiments of the disclosure. As with the example described with respect to FIGS. 2 and 4, the synchronous rectifier 200 may include the synchronous rectifier chipset 202, such as an LT4320 chipset or a FAN6248 chipset, that is capable of controlling a synchronous rectification process. As used herein, the term chipset may refer to a collection of integrated circuits that form a set used to make an electronic device, such as the synchronous rectifier 200. Other chipsets capable of controlling a synchronous rectification process may also be used in addition to or in place of the synchronous rectifier chipset 202. The synchronous rectification process may enable rectification of an AC power source 204 to provide DC power to the chlorinator electronics 109. As shown, the synchronous rectifier 200 may include the set of MOSFETs 206 that replaces biasing devices, such as diodes, in other rectifier arrangements. Additionally, in some examples, an output-voltage feedback 502 may be fed into the controller 210 of the synchronous rectifier 200. Based on the output-voltage feedback 502, the controller 210 may control timing of the MOSFETs 206 in the synchronous rectifier to maintain a desired output voltage. While the output-voltage feedback 502 is depicted with respect to the example described in FIG. 5, the output-voltage feedback 502 may similarly be implemented in any of the additional examples disclosed herein to provide additional control over the DC voltage provided to the chlorinator electronics 109.

In an example, the DC power provided to the chlorinator electronics 109 may be converted from the AC power source 204 using a transformer 502 and the synchronous rectifier 200. In some examples, the synchronous rectifier 200 may be positioned on a secondary side of the power supplied by the AC power source 204. In other words, the synchronous rectifier 200 is positioned on the secondary side of the transformer 502. In some examples, the transformer 502 may be an isolating transformer, such as a toroidal transformer in a toroidal power supply, that is able to step down the voltage provided by the AC power source 204 in a manner sufficient for use by the chlorinator electronics 109. Accordingly, the DC-to-DC converter 402 is avoided, and the output of the synchronous rectifier 200 is provided directly to the chlorinator electronics 109. Further, while the synchronous rectifier 200 and the transformer 502 are depicted as being within a housing of the chlorinator 102, the synchronous rectifier 200 and the transformer 502 may be either disposed within the housing of the chlorinator 102 or positioned external to the housing of the chlorinator 102.

In an additional example, the transformer 502 may be used in conjunction with the DC-to-DC converter 402 of FIG. 4. For example, the transformer 502 may not step down the voltage from the AC power source 204 prior to rectification by the synchronous rectifier 200. In such an example, the DC-to-DC converter 402 may step down a voltage output by the synchronous rectifier 200 to achieve voltage levels suitable for the chlorinator electronics 109.

Figure 6:
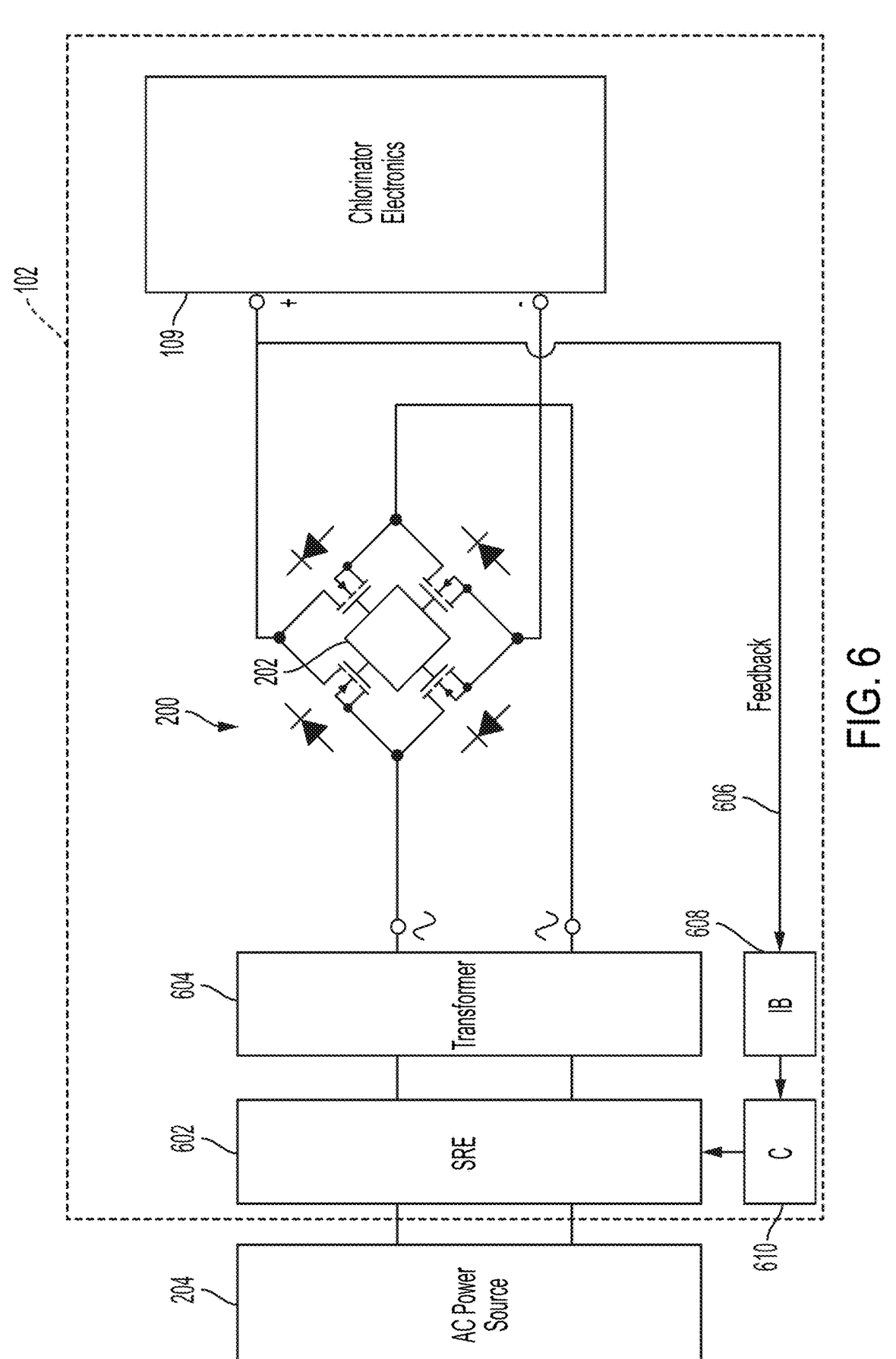
FIG. 6 illustrates an additional example of a synchronous rectifier of a chlorinator of the pool system of FIG. 1 according to embodiments of the disclosure.

FIG. 6 illustrates an additional example of the synchronous rectifier 200 of a chlorinator of the pool system 100 according to embodiments of the disclosure. As with the example described with respect to FIGS. 2, 4, and 5, the synchronous rectifier 200 may include the synchronous rectifier chipset 202, such as an LT4320 chipset or a FAN6248 chipset, that is capable of controlling a synchronous rectification process. As used herein, the term chipset may refer to a collection of integrated circuits that form a set used to make an electronic device, such as the synchronous rectifier 200. Other chipsets capable of controlling a synchronous rectification process may also be used in addition to or in place of the synchronous rectifier chipset 202. The synchronous rectification process may enable rectification of an AC power source 204 to provide DC power to the chlorinator electronics 109. As shown, the synchronous rectifier 200 may include the set of MOSFETs 206 that replaces biasing devices, such as diodes, in other rectifier arrangements. Additionally, in some examples.

In an example, the AC power source 204 may be electrically coupled to a set of switching regulating elements 602. In an example, the switching regulating elements may convert the AC power source 204 to a switched-mode power source. The switching regulating elements 602 use switching devices to convert the AC power source 204 from a lower frequency of 50 or 60 Hz to a much a higher operating frequency of, for example, 50 kHz-1 MHz. Due to the high operating frequency produced by the switching regulating elements 602, a transformer 604 that is smaller than the transformer 502 used with a linear power supply may be implemented with the synchronous rectifier 200. Additionally, the switching regulating elements 602 may function to step down the mains power voltage prior to the transformer 604 to a voltage level suitable for the chlorinator electronics 109. In some examples, the voltage may be regulated by the switching regulating elements 602 based on a voltage-output feedback 606 provided from an output of the synchronous rectifier 200, through an isolation harrier 608, and to a controller 610 for the switching regulating elements 602.

The synchronous rectifier 200 is positioned on the secondary side of the transformer 604. In some examples, the transformer 604 may be an isolating transformer. Further, while the synchronous rectifier 200, the switching regulating elements 602, and the transformer 604 are depicted as being part of the chlorinator 102, the synchronous rectifier 200, the switching regulating elements 602, and the transformer 604 may be disposed either within a housing of the chlorinator 102 or at a location external to the housing of the chlorinator 102.

Figure 7:
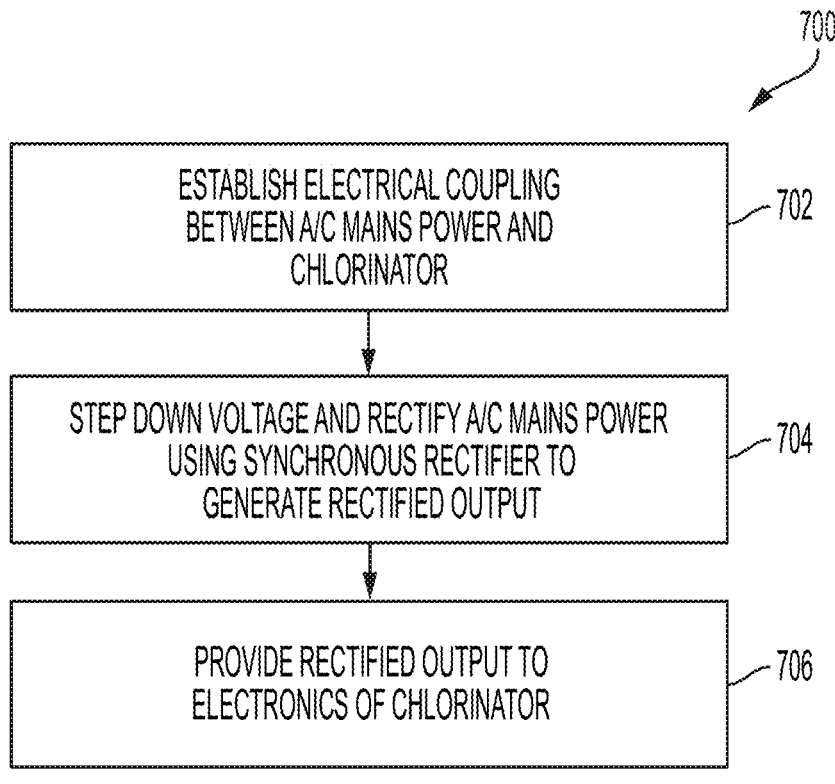
FIG. 7 illustrates a flowchart of a process for synchronously rectifying a power supply for a chlorinator according to embodiments of the disclosure.

FIG. 7 illustrates a flowchart of a process 700 for synchronously rectifying a power supply for the chlorinator 102 according to embodiments of the disclosure. At block 702, the process 700 involves establishing an electrical coupling between the AC power source 204 and the chlorinator 102. In an example, the electrical coupling may be through the transformer 502 and the synchronous rectifier 200, such as in a linear power supply arrangement. In an additional example, the electrical coupling may be through the synchronous rectifier 200 and the DC-to-DC converter 402, such as in a switched-mode power supply arrangement.

At block 704, the process 700 involves stepping down the voltage to a level usable by the chlorinator 102 and rectifying the A/C mains power of the AC power source 204. For example, the transformer 502 or the DC-to-DC converter 402 may step down the voltage to the desired voltage level of the chlorinator 102. Additionally, the synchronous rectifier 200 may rectify the A/C mains power to generate the rectified output for use by the chlorinator electronics 109.

At block 706, the process 700 involves providing the rectified output from the synchronous rectifier 200 to the chlorinator 102. In an example, the chlorinator 102 may use the rectified output to power electronics for performing chlorination operations and for communicating with other components of the pool system 100.

Figure 8:
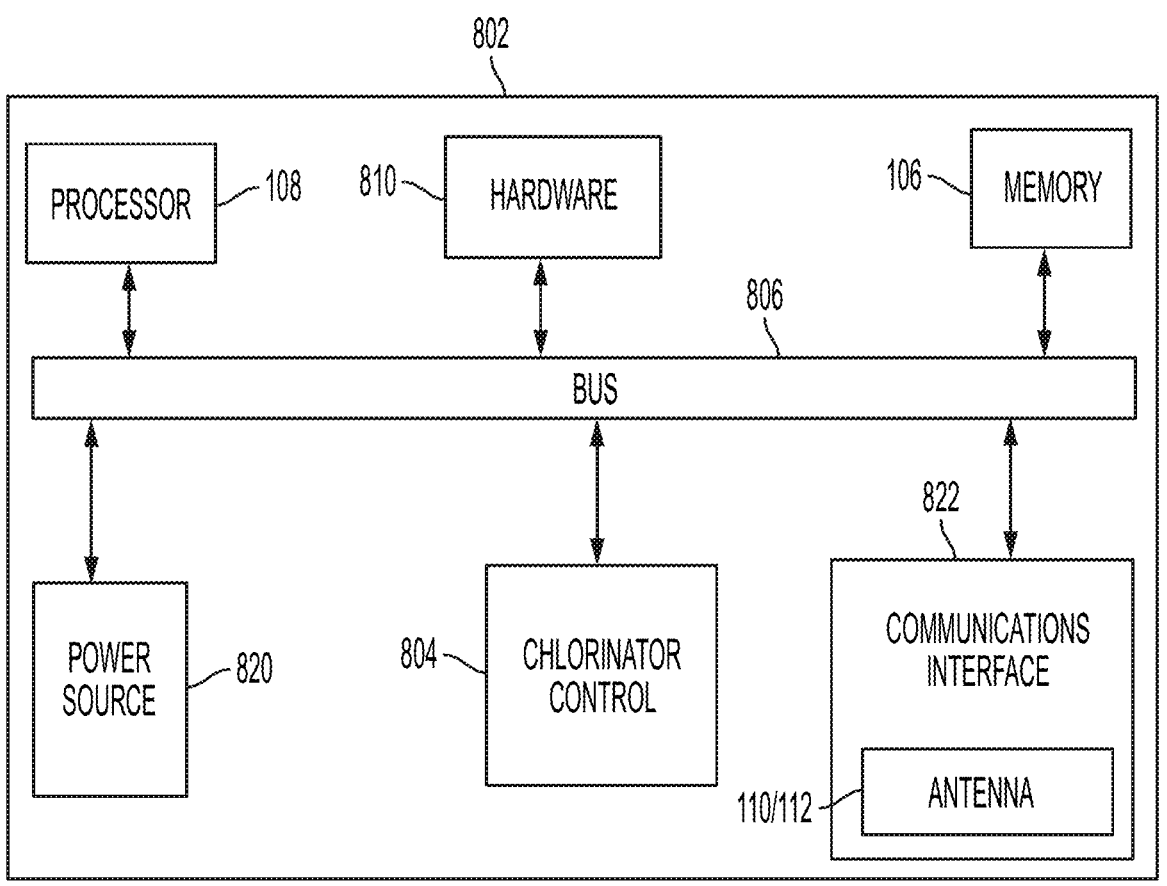
FIG. 8 is a block diagram of an example of a computing system usable with a chlorinator system according to some aspects of the present disclosure.

FIG. 8 is a block diagram of an example of a computing system 802, such as the computing system 104 of FIG. 1, usable with the chlorinator 102 according to some aspects. In some examples, the components shown in FIG. 7 (e.g., the power source 820, chlorinator control 804, communications interface 822, processor 108, memory 106, and hardware 810) can be integrated into a single structure. For example, the components can be within a single housing, such as within the housing of the chlorinator 102. In other examples, the components shown in FIG. 7 can be distributed (e.g., in separate housings) and in electrical communication with each other.

The computing system 802 can include the processor 108, the memory 106, and a bus 806. The processor 108 can execute one or more operations for operating the computing system 802. The processor 108 can execute instructions stored in the memory 106 to perform the operations. The processor 108 can include one processing device or multiple processing devices. Non-limiting examples of the processor 108 include a Field-Programmable Gate Array ("FPGA"), an application-specific integrated circuit ("ASIC"), a microprocessor, etc.

The processor 108 can be communicatively coupled to the memory 106 via the bus 806. The non-volatile memory 106 may include any type of memory device that retains stored information when powered off. Non-limiting examples of the memory 106 include electrically erasable and programmable read-only memory ("EEPROM"), flash memory, or any other type of non-volatile memory. In some examples, at least some of the memory 106 can include a non-transitory medium from which the processor 108 can read instructions. A non-transitory computer-readable medium can include electronic, optical, magnetic, or other storage devices capable of providing the processor 108 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which the processor 108 can read instructions. The instructions can include processor-specific instructions generated by a compiler or an interpreter from code written in any suitable computer-programming language, including, for example, C, C++, C#, etc.

The computing system 802 can include a power source 820. In some examples, the power source 820 can include the synchronous rectifier 200 (e.g., for rectifying an AC power source). The computing system 802 can include a communications interface 822. The communications interface 822 can include a wireless interface, which can include one or more antennas 110 or 112. In some examples, part of the communications interface 822 can be implemented in software. For example, the communications interface 822 can include instructions stored in memory 106.

The computing system 802 can use the communications interface 822 to communicate with one or more external devices. In some examples, the communications interface 822 can amplify, filter, demodulate, demuitiplex, frequency shift, and otherwise manipulate a signal received from an external device, such as a pool and spa system component. The communications interface 822 can transmit a signal associated with the received signal to the processor 108 or the hardware 810. The processor 108 or hardware 810 can receive and analyze the signal to retrieve data associated with the received signal.

In some examples, the computing system 802 can analyze the data from the communications interface 822 and perform one or more functions. For example, the computing system 802 can generate a response based on the data. The computing system 802 (e.g., using the processor 108) can cause a response signal associated with the response to be transmitted to the communications interface 822. The communications interface 822 can generate a transmission signal (e.g., via the antenna 110 or 112) to communicate the response to a remote computing device. For example, the communications interface 822 can amplify, filter, modulate, frequency shift, multiplex, and otherwise manipulate the response signal to generate the transmission signal. In some examples, the communications interface 822 can encode data within the response signal using a modulation technique (e.g., frequency modulation, amplitude modulation, or phase modulation) to generate the transmission signal. The communications interface 822 can transmit the transmission signal to the antenna 110 or 112. The antenna 110 or 112 can receive the transmission signal and responsively generate a wireless communication. In this manner, the computing system 802 can receive, analyze, and respond to communications from an external electronic device.

In some examples, the computing system 802 can include more, fewer, or different components than those shown in FIG. 7. Additionally or alternatively, the components of the computing system 802 can be configured differently than the configuration shown in FIG. 7. For example, the computing system 802 may not include the processor 108, the memory 106, or both. In such an example, the processor 108, the memory 106, or both may be arranged as a distributed computing device.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed:

1. A chlorinator system comprising:
   a swimming pool chlorinator configured to perform chlorination operations of a salt water pool system, the swimming pool chlorinator comprising:

an electrolysis cell configured to receive a flow of pool water and to electrolyze sodium chloride in the pool water to generate chlorine; and
control electronics configured to control operations of the swimming pool chlorinator;
a power source coupler configured to receive alternating current power from an alternating current power source;
a synchronous rectifier configured to convert the alternating current power to generate a direct current power source to provide power to the swimming pool chlorinator, wherein the synchronous rectifier comprises:
   an output-voltage feedback; and
   a controller configured to control the direct current power source generated by the synchronous rectifier using the output-voltage feedback; and
a transformer electrically coupled between the power source coupler and the synchronous rectifier, wherein the transformer is configured to electrically isolate the control electronics of the swimming pool chlorinator from the alternating current power source prior to rectification by the synchronous rectifier.

2. The chlorinator system of claim 1, wherein the synchronous rectifier comprises:
   a set of at least two metal-oxide-semiconductor field-effect transistors (MOSFETs); and
   a synchronous rectifier controller configured to control the operation of the set of at least two MOSFETs to generate the direct current power source.

3. The chlorinator system of claim 2, wherein the set of at least two MOSFETs and the synchronous rectifier controller are packaged in a synchronous rectifier chipset.

4. The chlorinator system of claim 1, further comprising:
   a buck converter configured to control a voltage value of the direct current power source generated by the synchronous rectifier to a voltage level usable by the swimming pool chlorinator, at least one transceiver, or a combination thereof.

5. The chlorinator system of claim 1, further comprising:
   a peristaltic pump and a pool lighting system, wherein the peristaltic pump and the pool lighting system are configured to receive direct current power from the direct current power source.

6. The chlorinator system of claim 5, further comprising:
   at least one pool and spa component comprising a pool sensor, a pool lighting controller, a water feature, a spa controller, a pump, a heater, or any combination thereof, wherein the at least one pool and spa component is configured to receive the direct current power from the direct current power source.

7. The chlorinator system of claim 1, further comprising:
   at least one transceiver configured to provide short-range communication between the swimming pool chlorinator and at least one additional component of the salt water pool and spa system, wherein the synchronous rectifier is further configured to provide power to the at least one transceiver.

8. A method comprising:
   establishing an electrical coupling between an alternating current mains power source and a chlorinator system of a salt water pool and spa system, wherein the electrical coupling comprises a transformer electrically coupled between the alternating current mains power source and a synchronous rectifier, wherein the transformer is configured to electrically isolate control electronics of the chlorinator system from the alternating current mains power source prior to rectification by the synchronous rectifier;

synchronously rectifying the alternating current mains power source using the synchronous rectifier of the chlorinator system to generate a direct current power source, wherein the synchronous rectifier comprises:

an output-voltage feedback; and a controller configured to control the direct current power source generated by the synchronous rectifier using the output-voltage feedback;

stepping down a voltage of the alternating current mains power source or the direct current power source; and providing the direct current power source at a stepped down voltage to electronics of the chlorinator system, wherein the electronics of the chlorinator system comprise:

an electrolysis cell configured to receive a flow of pool water and to electrolyze sodium chloride in the pool water to generate chlorine; and the control electronics configured to control operations of the chlorinator.

9. The method of claim 8, wherein stepping down the voltage comprises stepping down the voltage of the alternating current mains power using a step-down isolating transformer electrically coupled between the alternating current mains power source and the synchronous rectifier.

10. The method of claim 8, wherein stepping down the voltage comprises stepping down the voltage of the direct current power source using a buck converter electrically coupled between the synchronous rectifier and the electronics of the chlorinator system.

11. The method of claim 8, wherein the electronics of the chlorinator system further comprise a peristaltic pump, a lighting system, and an antenna control system of the salt water pool and spa system.

12. The method of claim 8, wherein synchronously rectifying the alternating current mains power source comprises:

controlling operation of a set of at least two metal-oxide-semiconductor field-effect transistors (MOSFETs) to rectify the alternating current of the alternating current mains power source.

13. The method of claim 12, wherein the set of at least two MOSFETS and a synchronous rectifier controller comprise a portion of a chipset, and wherein the synchronous rectifier controller controls the operation of the set of at least two MOSFETS.

14. A pool or spa system, comprising:

a chlorinator system comprising:

a swimming pool chlorinator configured to perform chlorination operations of a salt water pool system;

at least one transceiver configured to provide short-range communication between the swimming pool chlorinator and at least one additional component of the salt water pool and spa system;

a power source coupler configured to receive alternating current power from an alternating current power source; and a synchronous rectifier configured to convert the alternating current power to generate a direct current power source to provide power to the swimming pool chlorinator and the at least one transceiver, wherein the synchronous rectifier comprises:

an output-voltage feedback; and a controller configured to control the direct current power source generated by the synchronous rectifier using the output-voltage feedback; and a transformer electrically coupled between the power source coupler and the synchronous rectifier, wherein the transformer is configured to electrically isolate control electronics of the swimming pool chlorinator from the alternating current power source prior to rectification by the synchronous rectifier.

15. The pool or spa system of claim 14, further comprising:

the additional component comprising a hub device communicatively coupled to a plurality of pool or spa devices and the at least one transceiver of the chlorinator, wherein the additional component is configured to control the plurality of pool or spa devices using instructions received form the at least one transceiver of the chlorinator system.

16. The pool or spa system of claim 14, wherein the synchronous rectifier comprises:

a set of at least two metal-oxide-semiconductor field-effect transistors (MOSFETs); and a synchronous rectifier controller configured to control the operation of the set of at least two MOSFETs to generate the direct current power source.

17. The pool or spa system of claim 14, wherein the chlorinator system further comprises:

a buck converter configured to control a voltage value of the direct current power source generated by the synchronous rectifier to a voltage level usable by the swimming pool chlorinator, the at least one transceiver, or a combination thereof.

18. The pool or spa system of claim 14, wherein the chlorinator system further comprises:

a peristaltic pump and a pool lighting system, wherein the peristaltic pump and the pool lighting system are configured to receive direct current power from the direct current power source.

19. The pool or spa system of claim 14, wherein the chlorinator system further comprises:

at least one pool and spa component comprising a pool sensor, a pool lighting controller, a water feature, a spa controller, a pump, a heater, or any combination thereof, wherein the at least one pool and spa component is configured to receive the direct current power from the direct current power source.

* * * * *